United States Patent [19]

Tolliver et al.

[11] Patent Number: 5,682,635
[45] Date of Patent: Nov. 4, 1997

[54] BRIDGE AND ROAD CONSTRUCTION AND METHOD OF REMOVING WORN DECK STRUCTURE

[76] Inventors: Wilbur E. Tolliver, 6371 Kuttshill, NE., Rockford, Mich. 49341; Larry R. Magnuson, 5586 Grand Haven Rd., Muskegon, Mich. 49441

[21] Appl. No.: 467,601

[22] Filed: Jun. 6, 1995

Related U.S. Application Data

[63] Continuation-in-part of Ser. No. 239,049, May 6, 1994, which is a continuation-in-part of Ser. No. 842,086, Feb. 26, 1992, Pat. No. 5,309,691.

[51] Int. Cl.$^6$ .................................................. E01D 19/00
[52] U.S. Cl. .................... 14/14; 14/77.1; 404/1; 404/34; 404/47; 52/583.1
[58] Field of Search .................................. 404/30, 34, 35, 404/40, 41, 43, 46, 47, 48; 52/506.01, 506.05, 506.08, 512, 582.1, 582.2, 583.1, 591.5; 14/73.1, 73.5, 77.1, 78

[56] References Cited

U.S. PATENT DOCUMENTS

| 342,280 | 5/1886 | Burdick . |
|---|---|---|
| 1,120,471 | 12/1914 | Franklin . |
| 1,144,200 | 6/1915 | Hewett . |
| 1,271,708 | 7/1918 | Horstman . |
| 1,441,736 | 1/1923 | Metzsch . |
| 1,443,162 | 1/1923 | Bent . |
| 1,579,285 | 4/1926 | Danaher et al. . |
| 1,670,625 | 5/1928 | Johannesson . |
| 1,765,664 | 6/1930 | Flath . |

(List continued on next page.)

FOREIGN PATENT DOCUMENTS

| 645343 | 7/1962 | Canada . |
|---|---|---|
| 1004186 | 5/1964 | United Kingdom . |
| 2100772 | 1/1983 | United Kingdom . |
| 2199864 | 7/1988 | United Kingdom ...................... 404/35 |

OTHER PUBLICATIONS

Exhibit A includes pp. 14–29 and 33 from the March 1992 issue of National Underground Construction Association (NUCA) magazine, including articles disclosing various technologies concerning trenchless excavation construction methods, including jacking and related matters.

(List continued on next page.)

*Primary Examiner*—Henry A. Bennett
*Assistant Examiner*—Pamela Anne O'Conner
*Attorney, Agent, or Firm*—Price, Heneveld, Cooper, DeWitt & Litton

[57] ABSTRACT

A reinforced precast construction includes a generally panel-shaped reinforced concrete structural unit having a relatively flat upper surface adapted to support vehicles thereon and opposing ends configured to be positioned in abutting end-to-end contact and in abutting side-to-side contact. One of the opposing ends includes a horizontally extending gasket so that, when abutted against an adjacent identical article in an elongated arrangement, the abutting opposing ends sealingly engage the seal. Connectors are attached to the structural unit in positions so that they align and are interconnectable with fasteners to hold the structural unit to an adjacent previously laid structural unit. In one form, the precast structural units are adapted to rest on parallel beams to form a bridge construction, and include locators for locating the precast structural units horizontally on the beams. In the bridge construction, various modules are provided that can be attached to the bridge construction to accommodate various needs, including integral and/or bolt-on modulars forming sidewalks, side rails, fascia, and warming passageways. Also, modules are provided for bridges having enlarged widths. In another form, precast articles are provided to construct a road. The articles are adapted to be positioned in adjacent rows in an alternating arrangement, such as to form a multilane highway. Each module includes depressions defined along its sides to create space for receiving laterally extending brackets in the adjacent row of precast structural units. Also, locator brackets are located proximate the ends of the article for engaging locators on adjacent structural units to align the adjacent abutting edges of the upper surface in the precast structural units.

54 Claims, 9 Drawing Sheets

U.S. PATENT DOCUMENTS

| | | | |
|---|---|---|---|
| 1,774,664 | 9/1930 | Parmley. | |
| 2,005,699 | 6/1935 | Gottwald. | |
| 2,042,132 | 5/1936 | Treskow. | |
| 2,321,873 | 6/1943 | Tate | 404/47 |
| 2,488,245 | 11/1949 | Smith. | |
| 2,732,230 | 1/1956 | Risley et al. . | |
| 3,333,388 | 8/1967 | Sandin. | |
| 3,557,670 | 1/1971 | Sutton | 404/35 |
| 3,677,581 | 7/1972 | Breitfuss | 285/292 |
| 4,026,582 | 5/1977 | Abe et al. | 285/45 |
| 4,042,308 | 8/1977 | Freedman | 404/1 |
| 4,047,388 | 9/1977 | Howlett | 61/45 R |
| 4,070,848 | 1/1978 | Lingle | 52/707 |
| 4,117,872 | 10/1978 | Gott et al. | 140/57 |
| 4,199,158 | 4/1980 | de Munck | 403/14 |
| 4,496,259 | 1/1985 | Foucher | 277/205 |
| 4,497,590 | 2/1985 | Chase | 405/152 |
| 4,606,671 | 8/1986 | Rasmussen | 403/359 |
| 4,781,006 | 11/1988 | Haynes | 52/583 |
| 4,830,536 | 5/1989 | Birch et al. | 405/153 |
| 4,900,607 | 2/1990 | Glang et al. | 428/131 |
| 4,930,677 | 6/1990 | Jolliffee | 228/120 |

OTHER PUBLICATIONS

Exhibit B is an article entitled "NUCA Microtunnelling Pipe Standards Task Group, Concrete Pipe Section" published Feb. 23, 1993, which includes a specification for reinforced concrete pipe and discloses compressible bearing strips.

Exhibit C is a report entitled "Market Impact Report #23" published by the American Concrete Pipe Association, received the week of April 24, 1994, which discloses governmental activity in tube-based transportation.

Exhibit D is an article entitled "Alaska–Siberia Bridge" published in the Apr. 1993 issue of Popular Mechanics, pp. 56–58, authored by Gregory T. Pope, disclosing a tube-based bridge and tunnel.

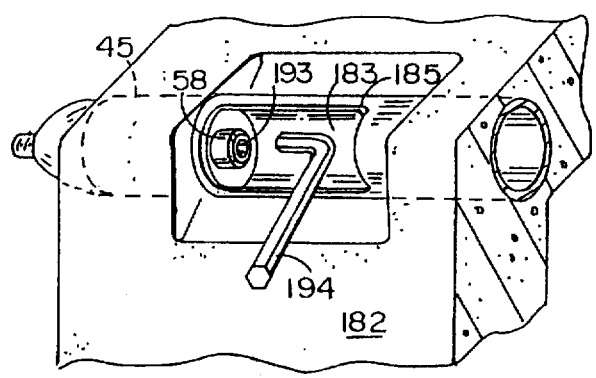
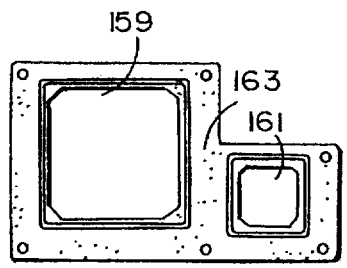
FIG. 17  FIG. 13
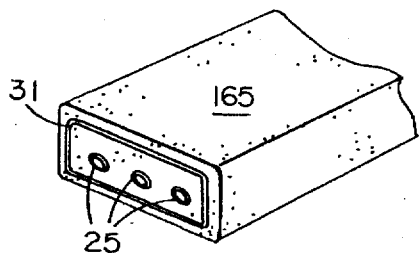
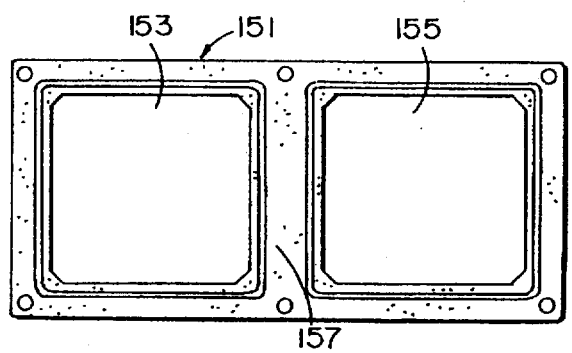
FIG. 14  FIG. 12
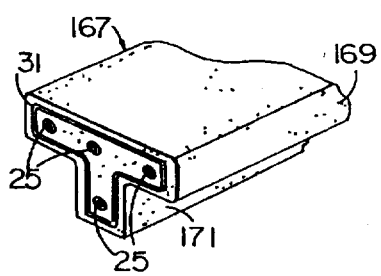
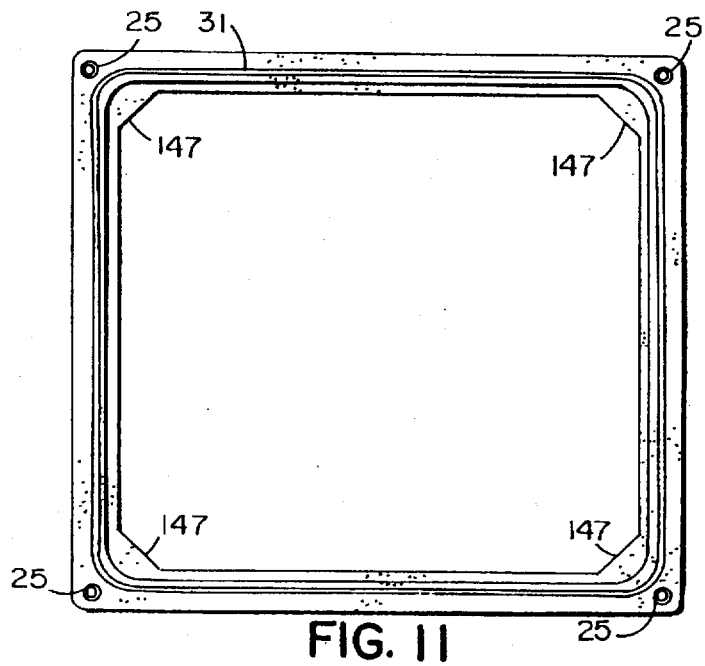
FIG. 15  FIG. 11

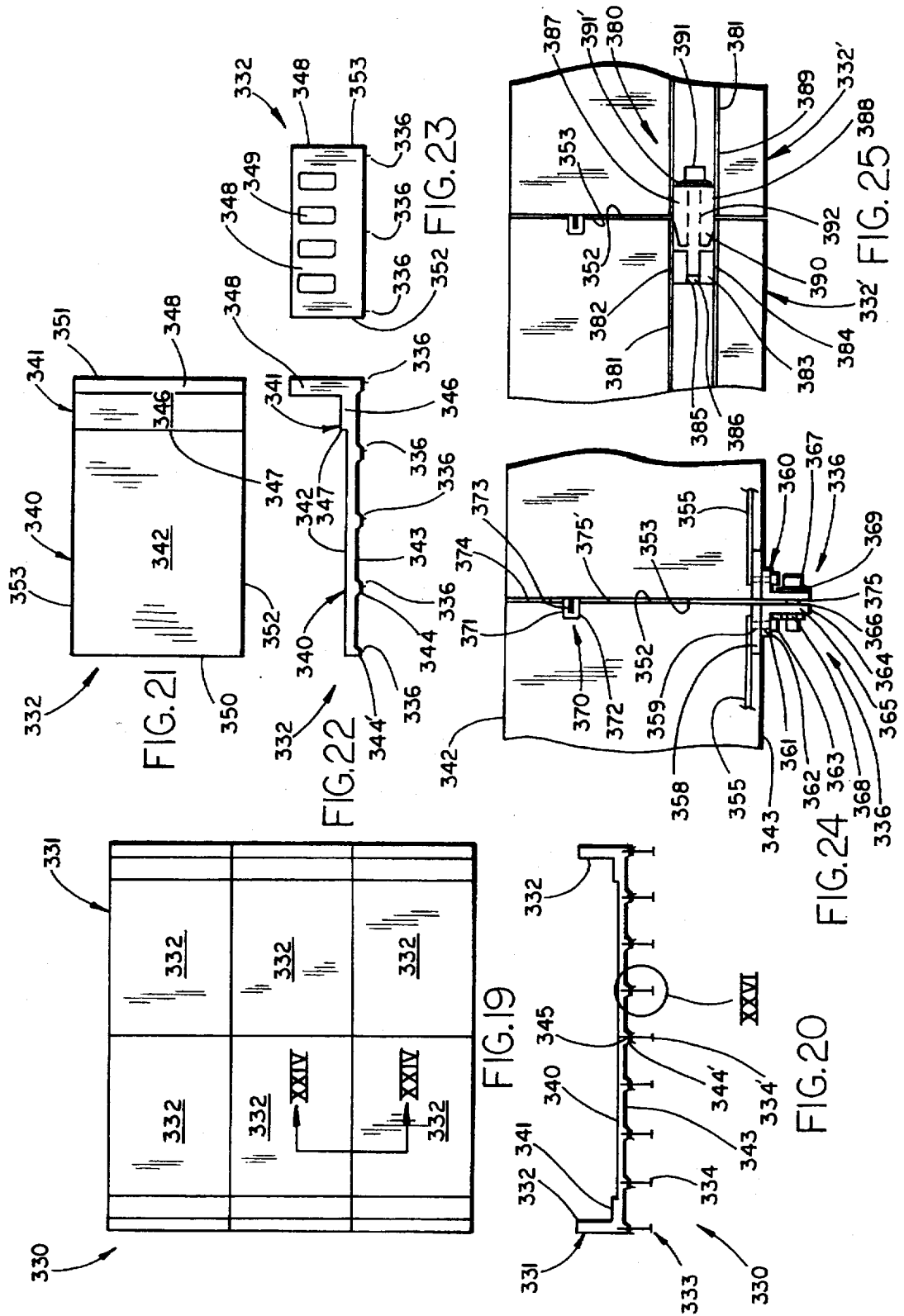

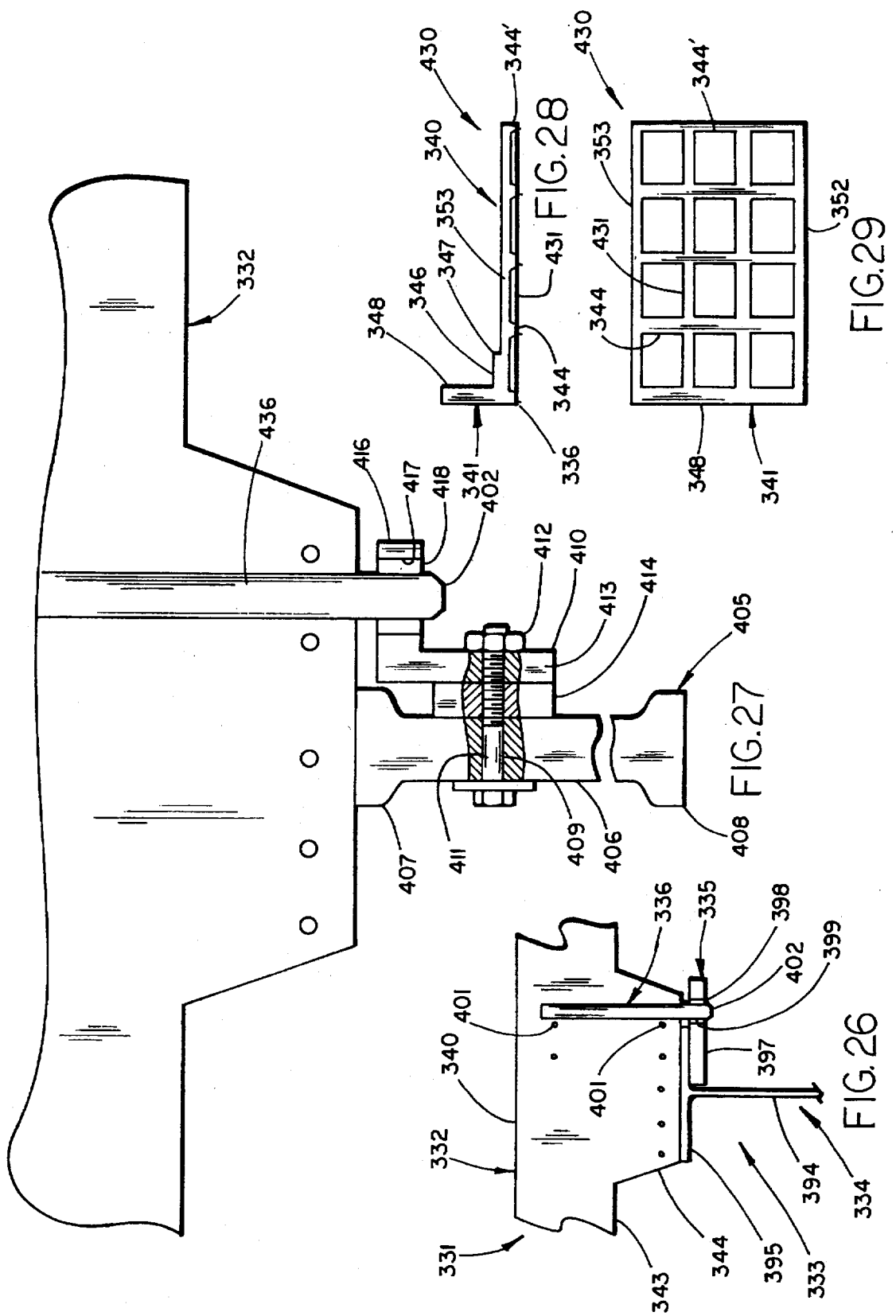

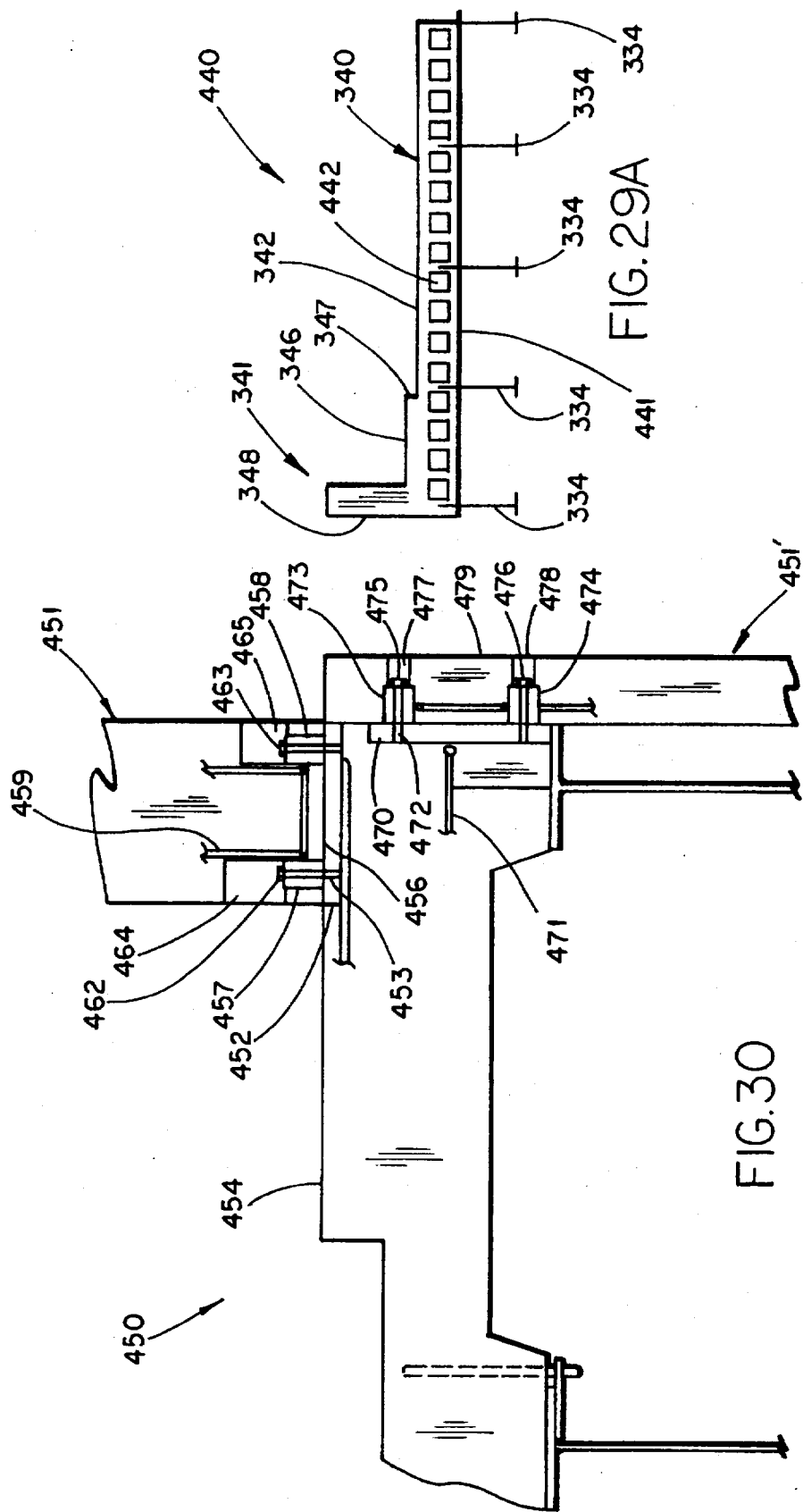

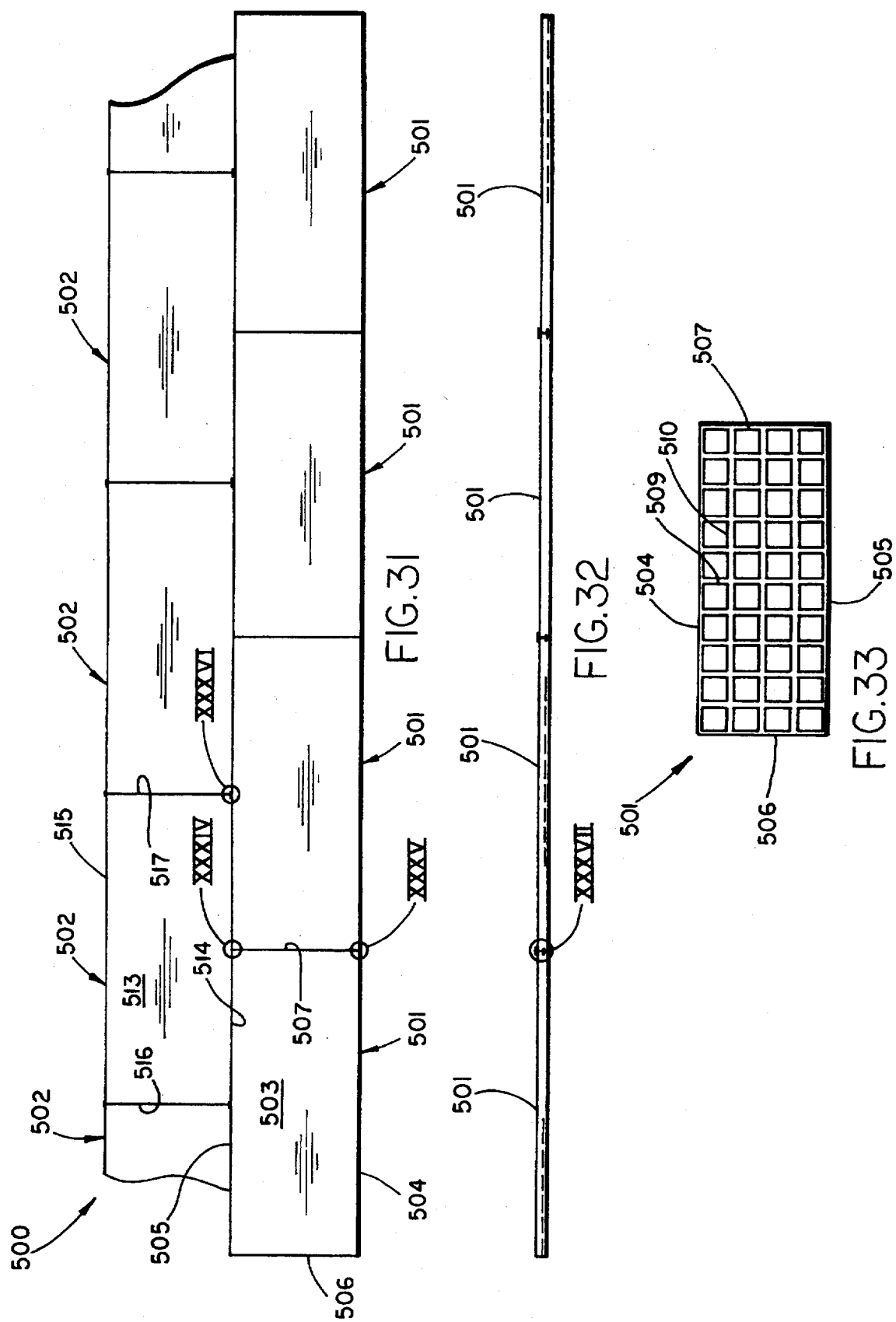

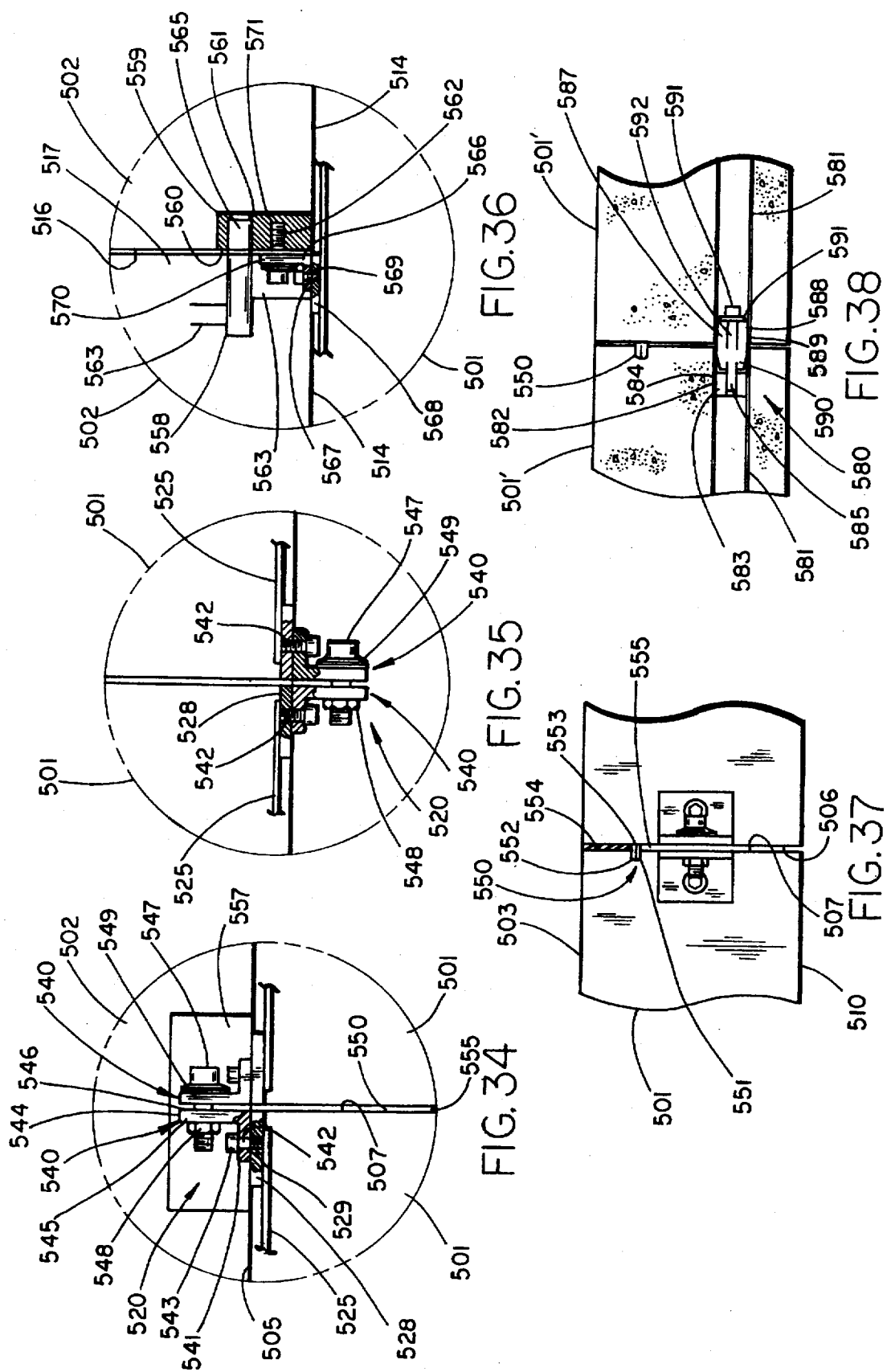

BRIDGE AND ROAD CONSTRUCTION AND METHOD OF REMOVING WORN DECK STRUCTURE

CROSS REFERENCE TO RELATED APPLICATION

This is a continuation-in-part of U.S. patent application Ser. No. 08/239,049, filed May 6, 1994, entitled SHEAR BOLT CONNECTED STRUCTURAL UNITS which, in turn, is a continuation-in-part of U.S. patent application Ser. No. 07/842,086, filed Feb. 26, 1992, (now U.S. Pat. No. 5,309,691, issued May 10, 1994) entitled SHEAR BOLT CONNECTED STRUCTURAL UNITS, the disclosures of which are incorporated herein by reference. The inventors are the same.

BACKGROUND OF THE INVENTION

The present invention concerns bridge and road constructions. Modern nations require good transportation infrastructure, such as roads and bridges, to promote and facilitate commerce. However, as commerce expands, new roads and bridges are needed, and existing roads and bridges must be maintained. Unfortunately, maintenance and upkeep of this infrastructure is costly, and with recent tight federal and state budgets, many highways and bridges are in a poor state of repair. New constructions and maintenance of existing infrastructure is costly for a number of reasons including the expensive machinery that must be used on-site, and also the construction time and skilled labor required on-site. Further, construction time is increased due to the time and effort that it takes to demolish and remove worn and damaged structures, and also is increased due to the time it takes to set up forms and cure concrete or apply new road-forming materials. Bridges are particularly problematic since construction must take place in a location several feet above ground. Replacing existing worn out bridge decks is expensive even if the existing foundation can be used since, aside from demolishing and removing the worn out bridge deck, most new bridge decks require special forms for casting the new deck structure. Also, it is often difficult or expensive to hire properly skilled labor in remote and rural areas. Another problem is the poor resistance of bridges, viaducts, roads and overpasses to destruction by earthquakes.

Thus, a construction solving the aforementioned problems is desired, and in particular which allows faster construction, accurate construction with close quality control and a maximum amount of prefabrication, modularity and repairability. Further, a construction is desired that is adapted for use in a variety of environments, locations, and applications.

SUMMARY OF THE INVENTION

The present invention includes a roadway construction formed by a plurality of interconnected precast structural units. The assembly of precast structural units allows relatively efficient and accurate construction with close quality control and a maximum mount of prefabrication, modularity, and repairability. Further, the interconnected assembly provides upgradability and also resistance to damage and catastrophic failure from unpredictable events such as earthquakes, particularly for bridges, overpasses, and the like.

These and other features, advantages and objects of the present invention will be further understood and appreciated by those skilled in the art by reference to the following specification, claims and appended drawings.

BRIEF DESCRIPTION OF THE DRAWINGS

FIG. 11 is a sectional view of a section of precast concrete box pipe having a tubular member embedded in each corner;

FIG. 12 is a sectional view of a double precast concrete box pipe having a common wall between each pipe;

FIG. 13 is a sectional view of a double precast concrete box pipe having a common wall between each pipe and with the pipes being of different sizes;

FIG. 14 is a partial perspective view of a section of precast pavement;

FIG. 15 is a partial perspective view of a section of precast decking;

FIG. 17 is a partial perspective view of a concrete unit having a bolt window and showing the shear bolt positioned in the guide member;

FIG. 19 is a plan view of a first modular bridge construction embodying the present invention including a plurality of interconnected structural units;

FIG. 20 is an end view of the modular bridge construction shown in FIG. 19;

FIGS. 21–23 are plan, end, and side views of the structural units shown in FIG. 19;

FIG. 24 is an enlarged, fragmentary, cross-sectional view taken along the plane XXIV—XXIV in FIG. 19;

FIG. 25 is a cross-sectional view of a first modified structural unit including an alternative connection system to that shown in FIG. 24, the alternative connection system including a shear bolt connection;

FIG. 26 is an enlarged, fragmentary, cross-sectional view of the circled area XXVI in FIG. 20;

FIG. 27 is an enlarged, fragmentary, cross-sectional view of a second modified structural unit including an alternative locating system to that shown in FIG. 26, the alternative locating system including an L-shaped locator bracket;

FIGS. 28 and 29 are end and bottom views of a retrofittable third modified structural unit for use in repairing existing bridge constructions;

FIG. 29A is an end view of a fourth modified structural unit embodying the present invention, the structural unit including integrally formed internal passageways therein;

FIG. 30 is an enlarged, fragmentary, end view of a fifth modified structural unit, the fifth structural unit including bolt-on side rails and a bolt-on facia;

FIGS. 31 and 32 are plan and side views of a road construction including alternatingly positioned sixth modified structural units particularly adapted for use in a roadway;

FIG. 33 is a bottom view of one of the structural units shown in FIG. 31;

FIGS. 34-36 are enlarged views of the circled areas XXIV, XXXV and XXXVI in FIG. 31;

FIG. 37 is an enlarged fragmentary view of the circled area XXXVII in FIG. 32; and FIG. 38 is a side view of a seventh modified structural unit including a connecting system for interconnecting the structural units shown in FIG. 31.

DETAILED DESCRIPTION OF PREFERRED EMBODIMENT

Figure 1:
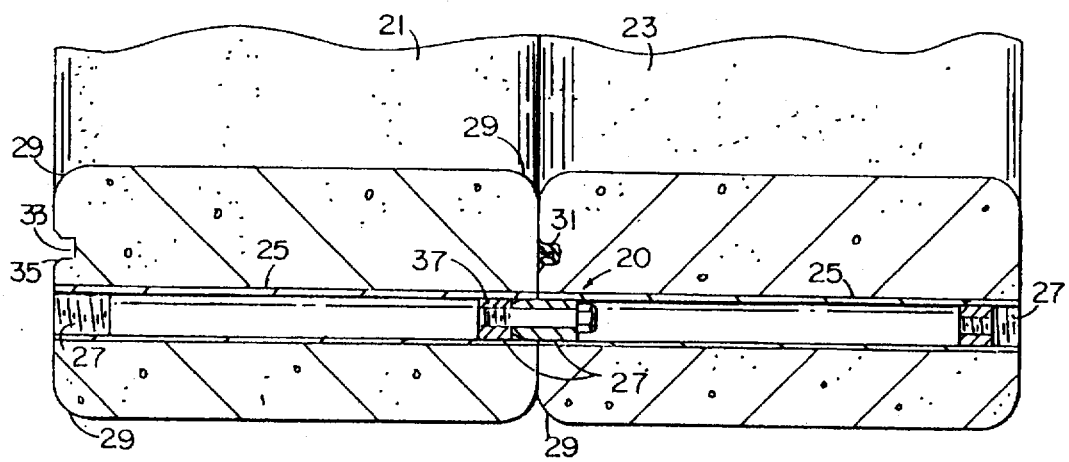
FIG. 1 is a fragmentary sectional view showing two concrete units joined together.

Referring to FIG. 1, a completed joint 20 is shown between two precast concrete structural units 21 and 23. The concrete units can be sections of a wall panel, a roof, a floor, a pavement or decking such as that used in the assembly of bridges, buildings or parking structures. It is specifically contemplated that the scope of the present invention includes many structural units other than those made with concrete, such as structural units made from reinforced and non-reinforced polymeric materials, composites, laminates, foamed concrete and other structural materials. Thus, the exemplary precast sections disclosed hereinafter are not intended to be interpreted as unnecessarily limiting.

Concrete structural unit 21 has a tubular member 25 therein which is cast within the concrete when the unit is formed. Tubular member 25 is preferably internally threaded at each end 27. Tubular member 25 is preferably proportioned to the size of the concrete unit into which it is cast. For example, for a large concrete unit eight to twelve feet long, a steel tube approximately two and one-half inches in outside diameter would be used. The tube would preferably have one-quarter inch wall thickness so the internal diameter of the tube would be two inches.

Concrete unit 21 is cast with rounded edges 29 to reduce the tendency for chipping along the edge of the unit. The edges of cast concrete units, for example pipes, tend to chip in handling which, if bad enough, can make the section of pipe useless.

In order to provide a fluid-tight seal between the ends of the concrete units, a gasket should be used. The gasket can be embedded into the concrete when it is poured to form the unit or it can be inserted into a groove formed in the face of the concrete unit. The inserted gasket is preferred since it can be added to and locked into the groove in the concrete unit at the construction site prior to joining the concrete units. It is also within the scope of the present invention to attach a gasket to an end of a concrete unit by means of an adhesive material. As shown in FIG. 1, the gaskets 31 are of the type which are inserted into a precast groove 33 in the end of the concrete unit. Groove 33 is provided with diverging walls 35 which provide a space for the gasket material to spread, as shown in concrete unit 23 when the units are brought together.

Concrete unit 23 also has tubular members 25 cast therein at the time it is formed. The tubular member, like member 25 in concrete member 21, has internally threaded end portions 27.

Figure 3:
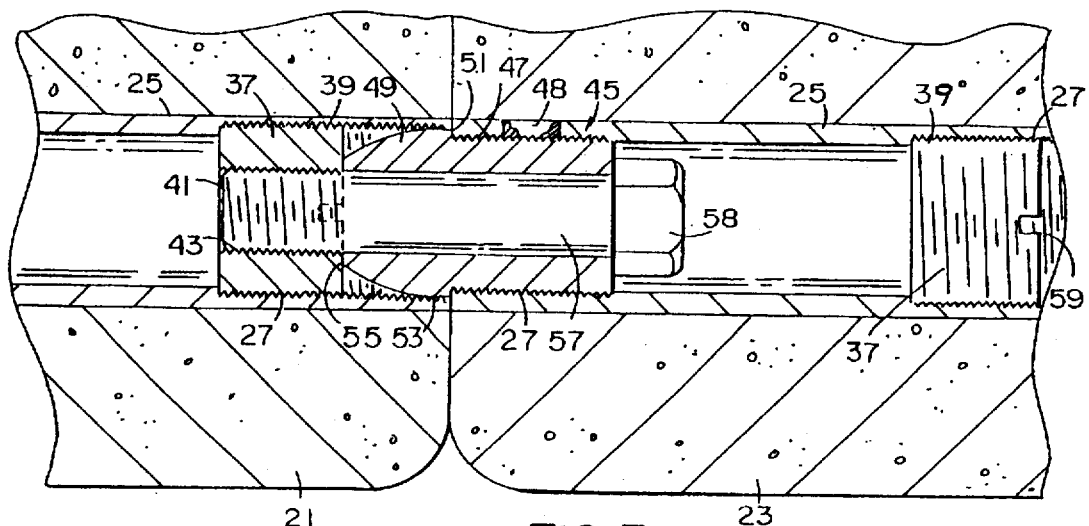
FIG. 3 is an enlarged fragmentary sectional view of a completed joint formed between two precast concrete units.

Prior to joining concrete units 21 and 23, and referring to FIG. 3 for clarity, an insert member 37 is threaded into tubular member 25 in concrete unit 21. Insert member 37 is made of steel and has an externally threaded portion 39 and an axial aperture or bore 41 which has an internal thread 43. A guide member 45 is threaded into tubular member 25 in concrete unit 23. Guide member 45 has a first threaded portion 47 which can be threaded into the end of tubular member 25 in concrete unit 23. Guide member 45 has a shaped end portion 49 which is preferably larger in diameter than threaded portion 47 forming a shoulder 51 which abuts the end of tubular member 25 when the guide member is threaded fully into position in the tubular member. Extending a short distance away from shoulder 51 is a circumferential shear band 53 which provides shear strength to the joint formed between the two concrete units. The shear band is approximately one-quarter inch in width. The shaped surface of the guide member then slopes toward an edge or face 55 which abuts or does not abut but is located proximate the insert member 37 when guide member 45 is inserted into concrete unit 21. Guide member 45 has an axial aperture or bore 57 which extends through the guide member and aligns with aperture 41 in insert member 37.

While it is preferred to employ internally threaded tubular members and threaded insert and guide members, it is within the scope of the present invention to use unthreaded members. Referring to FIG. 3, a port 48 is shown for providing access to the first portion of the guide member for welding it in place in the tubular member. A similar port can be provided for welding the insert member in place. The edge of the insert member can also be welded in place by reaching in through the open end of the tubular member with a welding rod. The axial shear bolt would still be used for joining the concrete units together.

Whether a threaded or smooth surfaced tubular member is used, it is important to keep the guide member from turning when the shear bolt is tightened. As can be seen in FIG. 3, when bolt 58 is tightened by turning in a clockwise direction, guide member 45 can unscrew out of the tubular member if it turns in the same direction. The rotation of the guide member 45 can be prevented by threading it tightly into the tubular member or by providing a reverse thread on guide member 45. Also, a small amount of adhesive can be used to glue the guide member in position. Also a small tack weld will hold it in place. A lock washer can also be used on the shear bolt between the insert member and the end of the guide member. While the lock washer can function to restrict rotation of the guide member, it is not preferred since it requires the use and handling of another part.

The concrete units are assembled moving from left to right, as shown in FIGS. 1 and 3. Insert member 37 is threaded into the end of tubular member 25 in concrete unit 21. Guide member 45 is threaded into the end of tubular member 25 in concrete unit 23. The concrete units are then brought together bringing end 49 of guide member 45 into the end of tubular member 25, in concrete unit 21. Face 55 on the guide member preferably abuts against or is otherwise positioned proximate the face of insert member 37. The axial passage 57 in guide member 45 aligns with axial passage 42 in insert member 37. A threaded bolt 58 is then inserted through tubular member 25 in concrete unit 23 and passes through guide member 45 to the internally threaded aperture in insert member 37. The bolt is then tightened to rarely join the two concrete units together. When the joint is bolted in place, the rubber gasket on one end of the concrete unit is compressed against the smooth end of the mating concrete unit to effect a fluid-tight face seal between the concrete units. Notably, the gasket seals the joint without being subjected to non-longitudinal loads such as shear loads or centering loads, and thus a longer lasting, more reliable sealed joint is achieved. After the joint is completed, another insert member 37 is threaded into the end of tubular member 25 in concrete unit 23 to prepare for the joining of the next concrete unit. In order to facilitate entry of the insert member; a slot 59 is provided in the face of the insert member into which a bladed tool can be inserted in order to easily rotate the insert member into position.

Figure 4:
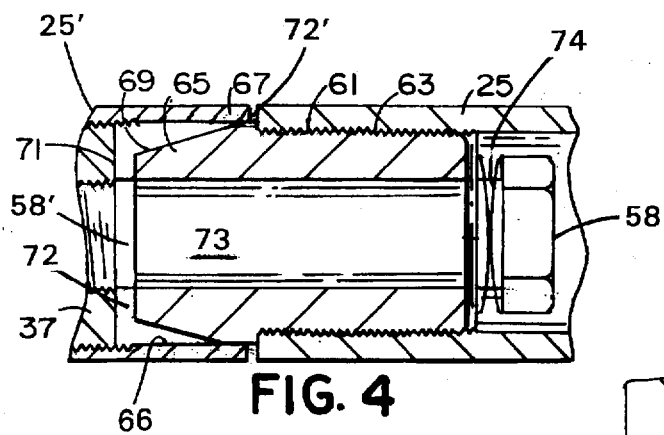
FIG. 4 is a sectional view of a second embodiment of a guide member.

Now referring to FIG. 4, a second embodiment of the guide member 61 is shown. Like guide member 45, guide member 61 has a threaded portion 63 and a shaped portion 65. Shaped portion 65 has a compound surface with a machined circumferential shear band 67 adjacent the end of tubular member 25' and a sloping surface portion 69 which ends at face 71. The overall configuration of the shaped surface is that of a truncated cone with the circumferential shear band surrounding the base of the cone. Guide member 61 has an axial aperture or bore 73 through which a bolt 58 can be passed for insertion into and tightening into insert member 37. Tubular member 25' has a machined bore 66 that extends from the end of tubular member 25' to threads 39. Machined bore 66 saves installation time by allowing insert 37 to be slid partway into tubular member 25' (rather than threading insert 37 into tubular member 25' the entire distance). The machined bore 66 also provides a solid engagement with shear band 67 which includes precisely controlled dimensions.

In FIG. 4, gaps 72 and 72' are created between tubular members 25 and 25' by a resilient gasket compressed between concrete structural units. (For example, see FIGS. 7, 8, 10A and 16.) A tensioning spring 74 such as a Belleville washer or multiple dished washers is positioned under the head of bolt 58 or in gap 72 around bolt shaft 58' to maintain a predetermined amount of tension on the connection in spite of thermal expansion of the concrete structural units. This arrangement is contemplated to be useful when the concrete structural units will be used on roads, for example, where considerable thermal expansion is expected.

Figure 2:
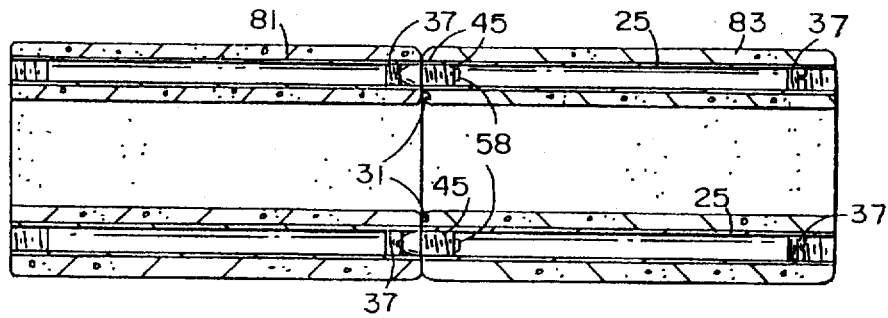
FIG. 2 is a sectional view showing two precast concrete pipes joined together.

As shown in FIG. 2, sections of precast concrete pipe 81 and 83 are joined together by insert members 37, guide members 45 and bolts 58. A gasket 31 surrounds the fluid passage in the connected pipes and is positioned between the fluid passage and the connecting hardware to protect the hardware from water or corrosive materials which might be passing through the pipe. As previously discussed, the pipe sections are connected from left to right with the joint being made and the bolt being inserted through guide member 45 into internally threaded insert member 37 and then tightened. The bolting action compresses the gasket causing a fluid-tight face seal to be formed between the face ends of the pipe section walls. Moving to the right after the joint is fastened together, an insert member 37 is inserted into the internally threaded end 27 of tubular members 25 in preparation for making the next joint. Insert member 37 is added after bolt 58 is tightened to secure the previously assembled joint. The insert member substantially closes the tubular member once the joint is complete.

In order to provide a fluid-tight joint, whether it be between pipe sections or sections of decking or pavement, a resilient gasket is preferably placed between the concrete units. Using the resilient gasket, a fluid-tight joint can be made without the addition or use of mortar or asphalt to seal the faces of the concrete sections forming the joint. The gasket is preferably made of a dense rubber-like polymeric material which can resist decomposition by water and its contaminants or, in the case of a pipe, whatever material is passing through the pipe.

Figure 5:
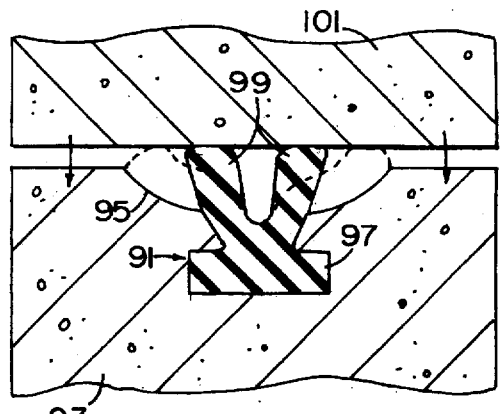
FIG. 5 is a sectional view of a cast-in-place gasket as a joint is being closed.
Figure 6:
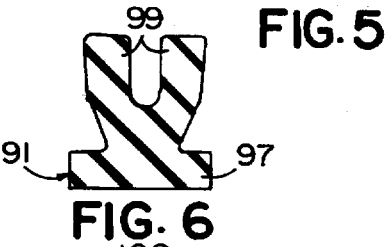
FIG. 6 is a cross-sectional view of a gasket which is cast in place when in use.
Figure 7:
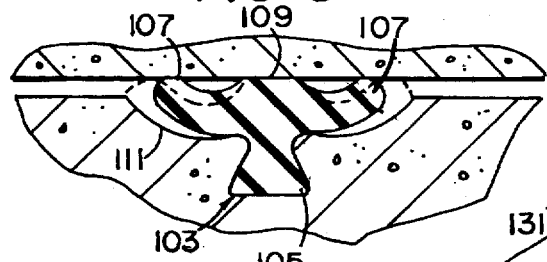
FIG. 7 is a sectional view of a second embodiment of a cast-in-place gasket.

As previously mentioned, the resilient gasket can be cast in place in the concrete unit when the unit is formed or can be added to a groove formed in the concrete unit. Referring to FIGS. 5, 6 and 7, two embodiments of a cast-in-place gasket are illustrated. In FIG. 5, the resilient gasket 91 has been east in place in a concrete unit 93. The surface of the concrete unit has a concave depression 95 in which the gasket is centered. The cast-in-place gasket has a substantially rectangular base portion 97 which locks the gasket in place in the body of concrete. Extending upwardly, as shown in FIG. 5, are a pair of spaced resilient legs 99 which form the seal between concrete units 93 and 101. The concave depression in the surface of concrete unit 93 enables legs 99 to bend backward or away from each other, as shown in phantom. As illustrated in FIG. 5, concrete unit 101 is vertically descending upon concrete unit 93 and gasket 91. The joint assembly forces spread legs 99 of the gasket outwardly. If concrete unit 101 were entering either from the left or right, depression 95 provides room for the legs 99 to flex to the left or right in a windshield wiper-like manner to form the seal. The depression provides room to accommodate the legs of the gasket so that they are not crushed in forming the joint. The legs of the gasket are substantially retained in shape to push against the surface of concrete unit 101 forming a fluid-tight seal.

The resilient cast-in-place gasket 103 (FIG. 7) has a substantially triangular base portion 105 with a pair of upstanding spaced legs 107 and a center crown 109 along one edge of the gasket. The triangular base portion is cast in place in the concrete which again has a relieved or concave surface portion 111 to enable legs 107 to move maintaining a fluid-tight seal without being crushed by the mass of the concrete units.

Figure 8:
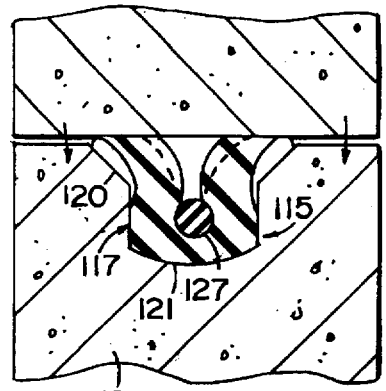
FIG. 8 is a sectional view of an inserted gasket in place between two precast concrete units as a joint is being formed.
Figures 9A, 9B:
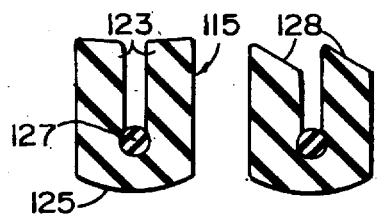
FIG. 9A is a cross-sectional view of a gasket for insertion into a groove formed in a concrete unit.
FIG. 9B is a gasket similar to that of FIG. 9a with shaped edges.

Now referring to FIGS. 8 and 9A, a gasket 115 is shown which is inserted into a groove 117 which is formed in the surface of concrete unit 119 when it is cast. Groove 117 has a relieved surface 120 with angled walls. The bottom of the groove 121 is arcuately shaped. Gasket 115 has a pair of spaced legs 123 and an arcuate back portion 125 which substantially conforms to the arcuate configuration of base portion 121 of groove 117. In FIGS. 8 and 9A, a cord of polymeric material 127, commonly referred to as an O-ring cord, is shown in place at the bottom of the groove formed between spaced legs 123. In using gasket 115, the gasket is pushed into groove 117 in the surface of the concrete unit. The cord of polymeric material 127 is then lubricated with a water or soap solution to facilitate entry of the cord between the spaced legs of the gasket. The gasket and the cord are each made of resilient rubber-like material and it is very difficult to insert cord 127 between legs 123 in view of the friction which results from trying to move the rubber-like materials across each other. The water soluble lubricant or soap solution facilitates the entry of the cord into the bottom of the groove where it can spread the legs of the gasket, as shown in FIG. 8, to tightly lock the gasket against the sidewalls of groove 117. Once gasket 115 is placed in the groove in the concrete surface of the concrete unit, and is locked in place by cord 127, it is extremely difficult to pull the gasket out of the groove. The gasket, as shown in FIGS. 9 and 9A, is the preferred gasket since it can be added at the construction site at the last moment before the concrete units are joined together. This maintains the integrity of the gasket and avoids possible damage to the gasket which might occur in shipping and handling.

The gasket shown in FIG. 9B has sloping edge potions 128. This gasket is preferably used in joining concrete units where the edges will be pushed over like a wiper blade. The sloping end surfaces will tend to align with the face of the concrete unit forming a seal.

Figure 10A:
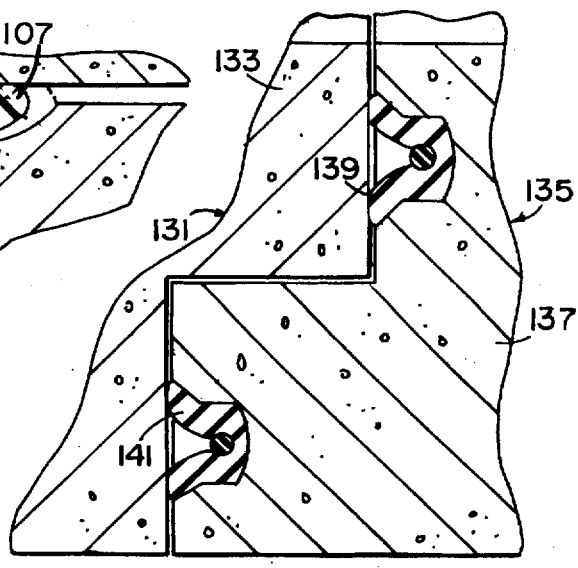
FIG. 10A is a sectional view showing possible positions for placement of a gasket in a male and female pipe joint.
Figures 10B, 18:
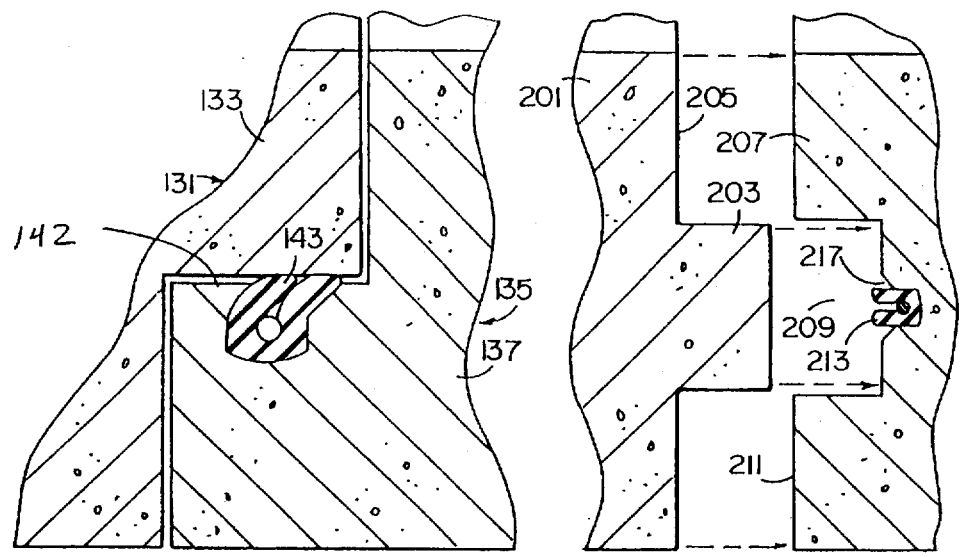
FIG. 10B is a sectional view showing a gasket on a substantially horizontal surface in a male and female joint.
FIG. 18 is a schematic elevational view of a keyway joint including a gasket.

Now referring to FIGS. 10A and 10B, a conventional male and female pipe joint is shown as commonly used with round, precast concrete pipe. In this type of joint, a first pipe section 131 would have an offset portion 133 while a second concrete pipe 135 would have a tapered portion 137. The tapered end is inserted into the opening bounded by the offset portion. By using the gasket material of the present invention, as shown in FIGS. 10A and 10B, the male and female pipe connections can be made without the necessity of the use of mortar or asphalt which tend to deteriorate over time causing the joint to leak. As shown in FIG. 10A, two positions are available for use with the resilient gasket. Gasket 139 is spread open as is gasket 141 by the direct force of the female portion of the pipe pressing against the male portion of the second pipe. Gasket 141 is positioned on the face of the tapered portion while gasket 139 is on the face of a surrounding shoulder. Turning to FIG. 10B, gasket 143 is on the top surface of the tapered portion and one leg is bent over the O-ring cord material in a windshield wiper-like manner as the two pipes telescope together. The two legs are bent over within the recessed portion of the groove and provide a fluid-tight seal for the pipe. Notably, the substantially horizontal surface 142 can be inclined for increasingly compressing gasket 143 as the pipe sections are brought together, if desired.

In FIG. 11, an end view of a precast concrete box pipe is shown. The pipe is substantially square and has a tubular member 25 cast in each corner of the pipe between the edge of the pipe and the haunch 147 of the pipe. The tubular member is cast in the concrete as far away from the axial center of the pipe as possible consistent with the strength of the concrete surrounding the tubular member. A gasket 31 is on the face of the pipe and is between the fluid passage and tubular members 25 where the joining hardware is assembled. Mounting the gasket in this position prevents any liquid material in the pipe from contacting the connecting or joining hardware protecting the hardware from rust or corrosion.

In FIG. 12, a double box pipe 151 is shown having a fluid passage 153 and 155 separated by a common wall 157. In FIG. 13, a similar construction is shown; however, fluid passage 159 is substantially larger than fluid passage 161. Again, the two fluid passages are separated by a common wall 163 and resilient gaskets which prevent mixing or intermingling of the two fluid streams. The double wall or the double box pipe construction is particularly useful in handling both storm drains and sewage. The two fluid materials are separated in their passage through the pipe and can be treated separately at the treatment center where they exit the pipe. By use of the double walled pipe, the expense of laying two adjacent pipes is reduced, as well as the time spent in excavating a large trench for handling two pipes. By providing a common wall between the two pipes, the width of the pipe assembly is substantially reduced.

Referring now to FIG. 14, a precast section of pavement 165 is shown which can be used in highway or bridge construction, or for the floor, roof, or sidewalls of a building. The pavement section has a plurality of tubular members 25 cast into the concrete. A gasket 31 surrounds the tubular members since water and other corrosive materials would tend to flow from the surface toward the hardware used to assemble the pavement sections. When utilizing the precast section 165 in a road construction, precast section 165 would be positioned on a graded bed of sand or other bed material adjacent a previously positioned precast section 165. It is contemplated that the preparation of the bed would be generally similar to methods known in the art of mad construction. The two adjacent precast sections 165 would then be interconnected as previously disclosed in this application. Advantageously, the resulting road construction would be continuously interconnected in a long assembly, with each pair of adjacent sections 165 interconnected to prevent undesirable lateral shifting (vertically or horizontally). Also, the gasket 31 and connection system allow thermal expansion of the sections 165 without buckling of the road construction. It is contemplated that the upper surface of section 165 can be planar or contoured, such as for channeling rain water and run-off or the like. Further, coating material such as tar or asphalt can be applied on the upper surface where particular road surfaces are desired. The coating material can be applied to the precast sections either before or after assembling the sections 165 together.

In FIG. 15 a precast concrete section of T-type decking 167 is shown which is of the type frequently used in the construction of building structures, including floors, walls, or roofs, and parking structures. The section of decking has a wide, substantially flat top 169 which is supported by a vertical section 171. A plurality of tubular members 25 have been cast into the section of decking. A gasket 31 surrounds the tubular member since, like pavement section 165, water and other corrosive materials will tend to flow down from the surface onto the connecting hardware used to assemble the decking. Sections 165 (FIG. 4) and sections 167 (FIG. 15) also can be advantageously used in bridge constructions. For example, sections 167 can be placed on girders or bridge support structure for forming the decking or road forming portion of the bridge construction. The bridge support structure could be constructed by methods similar to methods known in the art of bridge building. Advantageously, the interconnected assembly would provide strength, and also provide increased safety and resistance to destruction by earthquakes and other catastrophic events.

The worn deck of a bridge can be demolished and removed to uncover a structurally sound bridge deck support including horizontally extending beams. A new deck can then be provided by installing the precast structural modules of this invention onto a properly prepared upper surface of the bridge deck support structure, and then interconnecting the structural modules.

Figure 16:
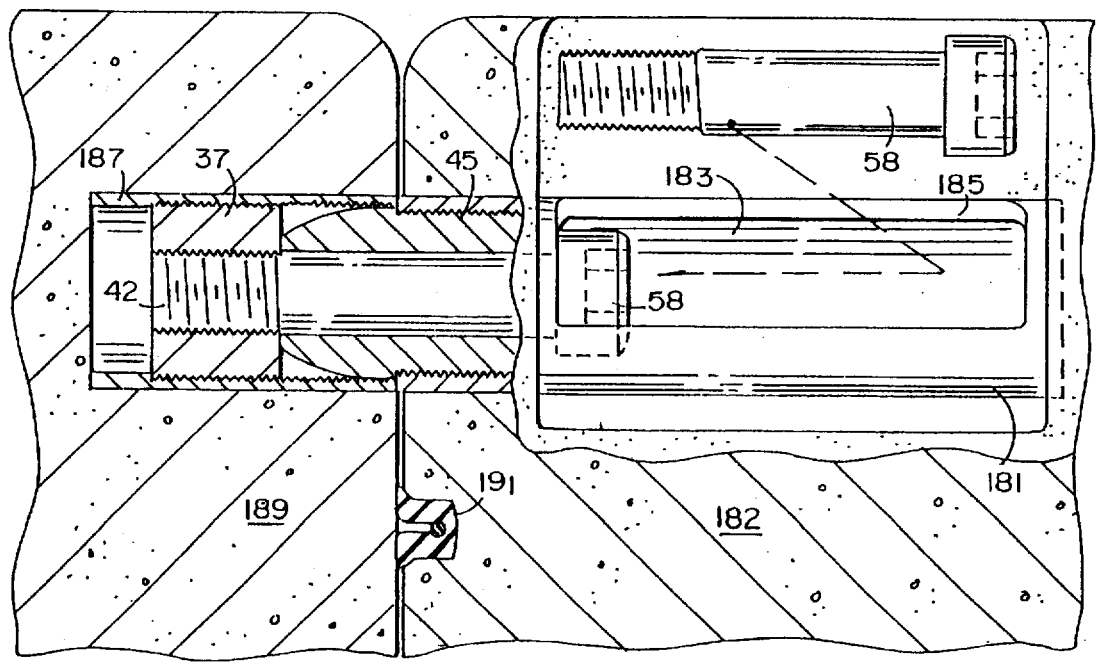
FIG. 16 is a fragmentary view of a concrete unit having a bolt window in the tubular member to facilitate the positioning of the shear bolt.

Referring to FIG. 16, a second embodiment of the apparatus for joining precast concrete units is shown, for purposes of illustration, in a corner of a precast box pipe. A shortened tubular member 181 has been cast into the corner of box pipe section 182 having a bolt window 183 bounded by edge 185. A guide member 45 is positioned in the end of tubular member 181, as previously described. Since the bolt window is provided for inserting shear bolt 58, the tubular member does not have to extend fully across the concrete unit for insertion of the bolt into guide member 45 and on through into threaded aperture 42 in insert member 37. Insert member 37 is positioned in a shortened tubular member 187 positioned in a corner of a second precast concrete box pipe 189. A resilient gasket 191 provides a water-tight seal for the joint.

In making the section of concrete box pipe 182, and referring to FIG. 17, bolt window 183 can be covered or filled with polystyrene or other suitable material to prevent concrete from entering into tubular member 181 through aperture 185 which defines the bolt window. The concrete can then be poured to form the box pipe.

After the concrete has hardened, the cover can be removed to provide access to the rear of guide member 45 for shear bolt 58. The head of bolt 58 has a shaped socket 193 for receiving an Allen-type wrench 194 for tightening bolt 58 into position. After the joint has been completed, the bolt window and portion of concrete unit 182 can be filled with concrete and shaped to conform to the rest of the corner of the concrete unit. If it is intended that the concrete units can be disassembled, the bolt window can be covered and then the concrete corner can be completed.

When a joint is made between two precast concrete units using the hardware of the present invention, the shear band on the guide member and the bolt provide the shear strength for the joint. It is within the scope of the present invention to provide a further increase in shear strength by shaping the end faces of the concrete units in a tongue-and-groove manner, as shown in FIG. 18. Concrete unit 201 has a projecting key 203 on the end face 205. A second concrete unit 207 has a recess or keyway 209 formed in surface 211. A resilient gasket 213 is mounted in a shaped groove 215 which has a relieved surface 217 on either side of the groove.

When units 201 and 207 are joined together by hardware (not shown) in order to simplify the drawing, key 203 will be positioned in keyway 209. The face of key 203 will press against gasket 213 to provide a fluid-tight seal while the tongue-and-groove fit of 203 and 209 will substantially increase the shear strength of the joint between the concrete units.

A bridge or roadway construction 330 (FIGS. 19–20) embodying the present invention includes an elongated assembly 331 of interconnected and opposingly paired modular precast concrete structural units 332 forming a two lane highway supported on a structural framework 333. Structural framework 333 includes a plurality of I-beams 334 supported at least at their ends by foundations or pillars. The support of structural framework 333 at its ends for bridge constructions, overpasses, viaducts, and the like is generally known in the art and need not be described in detail herein for a complete understanding of the present invention. Bridge construction 330 includes a locating system for structural units 332 that includes a plurality of locator brackets 335 (FIG. 26) attached along the length of I-beams 334, and further includes a plurality of locator pins 336 on structural units 332 for mateably engaging the locator brackets 335. Bridge construction 330 further includes a connecting system comprising a plurality of mating connectors 336 (FIG. 24) for interconnecting the structural units 332 longitudinally and laterally. Structural units 332 are prefabricated such that the on-site assembly of bridge construction 330 is relatively quick and efficient, and so that maximum advantage can be taken of skilled labor at a manufacturing site remote from the construction site. Further, bridge construction 330 is durable, economical to construct, and yet cost competitive. Still further, the interconnected assembly 331 provides an elongated interconnected assembly that cannot be easily shaken apart and damaged, such that it is structure resistant to damage by earthquakes and the like. At the same time, the assembly 331 can be readily repaired, such as by disconnecting and removing damaged or worn structural units 332 and replacing them with new structural units 332. Still further, the bridge construction 330 can be upgraded, such as by the addition of bolt-on modules or by the replacement of structural units as noted below.

Each structural unit 332 (FIGS. 21–23) is a precast reinforced concrete structure configured for connection laterally and longitudinally to adjacent structural units 332. It is contemplated that structural units will be manufactured of precast concrete and will be interconnectable in orthogonal directions, although it is contemplated that various other materials, arrangements and shapes can be constructed depending on the functional requirements of the bridge construction being built and the physical location of the bridge being constructed. The illustrated structural unit 332 is configured to form a two lane bridge, however, single lane and multiple lane bridges, overpasses, viaducts, and the like are also contemplated to be within the scope of the present invention. Each structural unit 332 includes a road-forming panel section 340 and a sidewalk-forming section 341. Road-forming panel section 340 includes a relatively flat upper surface 342 forming one lane of a bridge, and further includes a bottom surface 343 that is generally parallel upper surface 342. Upper surface 342 can be crowned or slightly inclined from side to side as desired. A series of flat bottom parallel ridges 344 are formed in the bottom surface 342 for engaging the top surface of upper flange 345 of I-beams 334 (FIG. 20). The innermost ridge 344' has a width equal to about half that of the other ridges 344 so that innermost ridge 344' can be rested on the center I-beam 334' abuttingly adjacent a corresponding innermost ridge 344' on the opposing structural unit 332. Asphalt and other pavement materials are applied to upper surface 342 to form a weather durable pavement thereon as desired.

Sidewalk-forming section 341 (FIGS. 21–23) includes a horizontal section 346 forming a sidewalk and a curb 347. A side rail 348 is integrally formed in side section 341 and extends vertically from a side of horizontal section 346. Side rail 348 includes apertures 349 that reduce the weight of structural unit 332 and further that permit visibility through side rail 348. It is contemplated that a variety of different side rails can be constructed including benches, emergency telephone cutaways, stairway exit cutaways, and numerous other adaptations for particular constructions. Also, the sidewalk-forming section 341 can be eliminated from the structural unit. In such case, the resulting structural unit defines a completely flat road-forming surface 342 from side to side, such that it can be used to form an intermediate member, such as for the center lane of a three lane bridge, or for use as a low level pedestrian bridge that is open on both sides.

Structural unit 332 (FIGS. 21–23) can be constructed in various sizes, thicknesses, and shapes depending on the functional requirements of the bridge or roadway to be constructed. As illustrated, structural unit 332 is about 18 to 20 feet wide, such that each lane of the two lane road has a width of about 14 to 16 feet. Structural unit 332 further has a length of about 12–15 feet long, although various lengths can also be constructed. It is noted that structural unit 332 can be modified to construct particularly designed "customized" sidewalks and/or curbs and/or integral side rails on one or both sides.

Structural unit 332 (FIGS. 21–23) includes sides 350 and 351 and opposing ends 352 and 353. The concrete material 354 within structural unit 332 is reinforced by a matrix of reinforcement wires or bars 355 (FIG. 6). An insert plate 358 is attached to the realfix of reinforcement wires 355 proximate each corner of structural unit 332 and at positions spaced along ends 352 and 353. Specifically, insert plate 358 is located on bottom 343 proximate end 352 and is welded to the matrix of reinforcement wires 355 so that the outer surface of insert plate 358 is flush with the bottom surface 343 and end 352. Insert plate 358 includes a threaded hole 359 that is oriented downwardly. As is apparent from FIG. 24, the embedded reinforcement wires 355 and the embedded insert plates 358 welded thereto, comprise a precast anchor to which connectors 336 are secured. Connector 336 includes an L-shaped bracket having a first leg 361 configured to abuttingly engage the outer surface of insert plate 358 along side 350. First leg 361 includes a hole 362 that aligns with threaded hole 359. A bolt 363 extends through hole 362 and threadably into hole 359 to secure the L bracket to plate 358 and to structural unit 332. The L bracket includes a second leg 364 that extends perpendicularly to first leg 361 and that has a hole 365 therein. Second leg 364 includes a surface 366 that generally aligns with the end 352. As shown in FIG. 24, when two structural units 332 are abutted end-to-end, holes 365 on adjacent legs 364 align. A bolt 367 is extended through holes 365 and secured in place by a nut 368. Belleville washers 369 are positioned on the head of bolt 367 or adjacent nut 368 to provide a zone of tension allowing thermal expansion across the abutting joints created between the adjacent structural units 332. The washers 369 can also be positioned in the gap 375 between legs 364 of abutting L brackets. It is noted that a resilient member can be placed between adjacent second legs 364 instead of a Belleville washer to further control the stress generated on the L brackets as nut 368 is tightened on bolts 367. Adhesive or other means can be used to assure that nut 368 does not become accidentally disengaged from bolt 367. A gasket or seal 370 includes a U-shaped sealing member 371 that fits into a transverse recess 372 in/across the end 352 of structural unit 332. A cord 373 is pressed into the center of U-shaped seal 371 to create frictional engagement at the base of U-shaped seal 371 in recess 372 to retain the seal 371 within the recess 372. Various other constructions are also contemplated, such as those shown in co-pending patent application Ser. No. 08/239,049 which was incorporated above by reference. An expansion material 374 is injected into the gap 375' between the end faces 352 and 353 on adjacent structural units 332 to prevent moisture from collecting, forming or freezing within the gap 375. This also prevents stones and particles from wedging into the gap 375. Seal 370 is crowned to prevent puddling of water thereon. Seal 370 is compressed as the gap 375 is closed between adjacent structural units 332 and between legs 364 on adjacent L brackets 360, and further forms with Belleville washers 369 and expansion material 374 an expansion joint to accommodate thermal expansion that affects the gap.

An alternative connecting system 380 (FIG. 25) is disclosed and shown in detail in the co-pending patent application Ser. No. 08/239,049 which was incorporated herein by reference above. Nonetheless, a disclosure is included herein to facilitate an understanding of the present invention. The connecting system 380 includes a tube 381 that extends longitudinally through and within structural unit 332' from end 352 to end 353. Alternatively, it is contemplated that a short tube section could also be used at each end, one end of the tube section being located flush with each end 352 and 353. Tube 381 includes a threaded end section 382 for threadably receiving and engaging an insert nut 383. Insert nut 383 includes exterior threads 384 for mateably engaging the threads on threaded tubular end 382, and further includes internal threads 385 that extend along an axially extending hole 386 in insert nut 383. A guide member 387 includes a threaded shank 388 for engaging a threaded second end 389 of tube 381. Guide member 387 further includes a tapered nose 390 for mateably engaging tubular threaded end 389 for guiding one structural unit 332' into alignment with a second abutting structural unit. A shear bolt 391 extends through a hole 392 in shear/guide member 387 and is configured to threadably engage threaded interior hole 385 on insert 383. Belleville washers 391' are used to control the tension and also keep the tension on shear bolt 391. Shear bolt 391 can be held in a tensioned condition and prevented from undesirable loosening by tack welding shear bolt 391 to insert nut 383 and by tack welding insert nut 383 to tube end 389. Alternatively, the tube ends 382 and/or 389 can be partially filled with filler material such as cement. The shear bolt connection system and variations thereof is further described in U.S. patent application Ser. No. 08/239,049. It is noted that, in FIG. 25, the tubes 381 extend longitudinally. However, tubes 381 could also extend transversely and/or could extend both longitudinally and laterally in a criss-crossing matrix. Also, it is noted that the connecting system shown in FIG. 25 could be used in combination with the connection system shown in FIG. 24.

The locator system for structure units 332 includes the locator brackets 335 and the locator pins 336 (FIG. 26). I beams 334 include a vertical center web 394, a horizontal top flange 395, and a horizontal bottom flange. Locator bracket 335 includes a panel bracket 397 welded to the underside of top flange 395. Panel bracket 397 includes a horizontally extending section having a hole 398 therein. A resilient washer-like bushing 399 is positioned within hole 398. Locator pin 336 is secured to structural unit 332 such as by welding or other attachment means to reinforcement wire matrix 401. Locator pin 336 includes a lower tapered end 402 configured to mateably engage the hole within resilient washer-like bushing 399. Tapered end 402 extends through washer-like bushing 399. It is contemplated that the weight of structural unit 332 in combination with the length of tapered end 402 will be sufficient to hold structure unit 332 on structural frame work 333, however a retention device such as a nut, clip, cotter pin, or the like can be used on the end of locator pin 336 if desired. Resilient washer-like bushing 399 permits some lateral longitudinal movement of locator pin 336 and hence some longitudinal/lateral movement of structural unit 332 on structural frame work 333. This allows the construction 330 to accommodate thermal expansion and relative but controlled movement and flexing between assembly 331. (i.e., the interconnected structural units 332) and the structural framework 333 (i.e., the I beams 334).

An alterative locating system (FIG. 27) includes a modified beam such as a concrete reinforced beam 405. Composite beam 405 includes a center web 406, a top flange 407, and a bottom flange 408. A horizontally oriented hole 409 is located in center web 406 generally proximate top flange 407. A spacer plate 414 is abutted against center web 406, and an L bracket 410 is secured to composite beam 406 at the top of center web 406 against spacer plate 414 by a bolt 411 and nut 412. Bolt 411 extends through the hole 409 in the beam, through the spacer plate 414, and through a vertical leg 413 of L bracket 410 and is secured therein by nut 412. L bracket 410 further includes a second leg 416 having a hole 417 therein. A resilient bushing 418 is positioned within hole 417, and the lowered tapered end 402 of locator pin 336 extends through resilient bushing 418 to retain structural unit 332 on composite beam 405 in a manner generally comparable to that discussed above concerning the first locator system of locator bracket 335 and locator pin 336.

A structural unit 430 (FIGS. 28–29) is generally identical to structural unit 332 with the exception that structural unit 430 includes parallel ridges 431 that extend laterally in a direction perpendicularly to ridges 344. The incorporation of transverse ridges 431 with longitudinal ridges 344 provides increased bearing surface for contacting a support surface on existing structural frame work for a bridge. The transverse ridges 431 also provide increased rigidity to structural unit 430.

Structure until 430 is particularly adapted for use in retrofitting an existing bridge having a mechanically sound support structure but worn or damaged bridge deck. To prepare a bridge in need of repair, the worn and damaged bridge deck is demolished and removed to expose the existing structural framework. This exposes the previous tie down structure that protrudes above the existing structural framework such as tie down bolts or loops of reinforcement wires. This tie down structure is cut or abrasively ground down flush to the top of the existing structural framework. New concrete is poured thereon to create a substantially level surface on structurally sound structural framework for supporting a new bridge deck. Also, locator brackets such as locator brackets 335 (or 410) are attached to the existing beams of the existing bridge structure. Retrofittable structure 430 includes locator pins 336 for engaging the corresponding locating structure/brackets attached to the existing bridge structure. Each structural unit 430 is attached in sequence end-to-end until the road surface of the new bridge deck is complete. Notably, various assembly sequences can be used. For example, the locator brackets 335 (or 110) can be attached to the existing structural framework after the structural units are placed on the existing structural framework is desired. Advantageously, the interconnection of the structural units assists in placement and securement of the structural units on the new bridge deck. At the same time, the bushings 418 allow flexing and independent movement of the structural assembly of structural units from the existing bridge framework.

A modified structural unit 440 (FIG. 29A) is generally identical to structural unit 332 with the exception that structural unit 440 includes a lower panel section 441 forming longitudinally extending internal passageways 442 that extend longitudinally the length of structural unit 440 between enlarged ridges 344. Thus, when a series of structural units 440 are assembled end-to-end, passageways 442 provide a matrix of continuous passageways under the road-forming surface 443. Passageways 442 can be interconnected by various transverse apertures (not specifically shown) or air can be allowed to flow and intermix between the various passageways at the ends of each structural unit 440. If desired, a seal can be extended in a closed loop around each of the passageways 442 or around the entire group of passageways 442 to prevent escape of air therebetween. Warming air can be passed through passageways 442 to control formation of ice or snow on road surface. 342. Alternatively, the passageways 442 can be connected to the road-forming surface 342 such that the passageways act as integral drains or storm sewer lines. Still further, pipes can be cast into the structural units to form integral warming passageways and/or storm sewer lines. Alternatively, the passageways can carry/contain utility lines such as telephone lines, electrical lines, cable TV lines, gas lines, water lines and the like.

Structural unit 450 (FIG. 30) includes a bolt-on precast, reinforced cement side rail 451 and a bolt-on precast, reinforced cement fascia 451'. Structure unit 450 includes an insert plate or anchor 452 having threaded holes 453 therein. Anchor 452 is positioned flush along an edge of road-forming or sidewalk-forming upper surface 454 in a generally horizontal orientation. Side rail 451 includes a lower end 456 configured to engage the upper surface on anchor 452. Side rail end 456 includes a pair of inserts 457 and 458 connected to the reinforcing matrix 459 within side rail 451. Inserts 457 and 458 include holes that generally align with threaded holes 453 on anchor 452. Bolts 462 and 463 are located in the holes of inserts 457 and 458, and are threaded into engagement with threaded holes 453 in anchor 452. Access apertures 464 and 465 in side rail 451 are large enough to accommodate installation of bolts 462 and 463 into anchor 452. Bolts 462 and 463 can be secured in place by filling passageways 464 and 465 with a filler cement, or alternatively, bolts can be securely locked in the position by lock washers, tack welding, adhesive, and other ways known in the art.

Another anchor 470 is attached to the reinforcement 471 within structure unit 450 and is located flush with a side surface of structure unit 450. The anchor 470 includes threaded holes 472. Fascia 452 includes a pair of inserts 473 and 474 having holes therein for receiving bolts 475 and 476. Access passageways 477 and 478 extend from an exterior side 479 in alignment with the holes 475 and 476. Bolts 475 and 476 are extended through holes in inserts 470 and threadably into holes 472 of anchor 471 to secure fascia 452 to the side of structure unit 450. Bolts 475 and 476 are secured in position in ways known in the art or as noted above.

A roadway or pavement construction 500 (FIGS. 31–33) includes a plurality of alternatingly positioned structural units 501 and 502 positioned adjacent to each other in two elongated rows. In the illustrated construction 500, each row forms a single lane in a highway. Further, the first row is formed by structural units 501 and the second row is formed by structural units 502. This allows each row to be particularly constructed for its particular functional requirements. For example, the row which forms the passing lane of a two lane expressway may have different requirements than the other lane which has a greater vehicle usage rate. Also, it is contemplated that various widths can be used and that various single or multilane highways can be constructed using the concepts embodied in the present invention. It is further contemplated that a single structural unit can be used for the entire road construction, or that three or more rows can be assembled side-by-side-by-side, as discussed below.

Structural unit 501 includes a road-forming surface 503, opposing sides 504 and 505, opposing ends 506 and 507 and a bottom surface 508. The bottom of structural unit 501 includes a matrix of orthogonally related flat-bottomed ribs 509 and 510 which rigidify structural unit 501. The depressions defined between the rigidifying matrix reduces the weight of the structural units, and further provides a surface for stably engaging a graded bed thereunder and for containing the graded bed to prevent or reduce washout and erosion. Similarly, structural units 502 include road-forming surface 513, opposing sides 514 and 515, and opposing ends 516 and 517, and a bottom. The bottom includes a matrix of flat-bottomed ribs comparable to the bottom surface of structural unit 501. Structural unit 502 is identical to structural unit 501 except as noted below.

The concrete material within structural unit 501 is reinforced by a matrix of reinforcement wires or bars 525 (FIG. 34). An insert plate or anchor 528 is attached to the matrix of reinforcement bars 525 at each corner of structural unit 501. Specifically, anchor 528 is located on side 504 proximate end 506 and is welded to the matrix of reinforcement bars 525 so that the outer surface of anchor 528 is flush with the side surface of side 504. Another anchor 528 is similarly located at side 504 proximate end 507, and also at side 505 and end 506, and also at side 505 and end 507.

Anchor 528 includes a threaded hole 529 that is oriented laterally. Connector 520 includes an L-shaped bracket 540 having a first leg 541 configured to abuttingly engage the outer surface of anchor 528 along side 505. First leg 541 includes a hole 542 that aligns with threaded hole 529. A bolt 543 extends through hole 542 and threadably into hole 529 to secure L bracket 540 to anchor 528 and to structural unit 501. L bracket 540 includes a second leg 544 that extends perpendicularly to first leg 541 having a hole 545 therein. Second leg 544 includes a surface 246 that generally aligns with the end 207. As shown in FIG. 24, when two structural units 501 are abutted end-to-end, holes 545 on adjacent legs 544 align. A bolt 547 is extended through holes 545 and secured in place by a nut 548. Belleville washers 549 are positioned on the head of bolt 547 or adjacent nut 548 to provide a zone of tension allowing thermal expansion across the abutting joints between the adjacent structural units 501. The washers 549 can also be positioned between legs 544 of abutting L brackets 540. It is noted that a resilient member can be placed between adjacent second legs 544 in addition to or instead of a Belleville washer to further control the stress generated on L brackets 540 as nut 548 is tightened on bolts 547. Welding, adhesive or other means can be used to assure that nut 548 does not become accidentally disengaged from bolt 547. A gasket or seal 550 (FIG. 37) extends transversely across the end 507 (FIG. 34). Seal 550 includes a U-shaped sealing member 551 that fits into a transverse recess 552 in/across the end 507 of structural unit 501, and further includes a cord 553 pressed into the center of the U-shaped seal 551 to create frictional engagement at the base of U-shaped seal 551 in recess 552 to retain the seal 551 within the recess 552. Various other constructions are also contemplated, such as those shown in co-pending patent application Ser. No. 08/239,049 which was incorporated above by reference. Seal 550 in structural unit 501 is crowned or angled to prevent puddling of water thereon. An expansion material 554 is also injected into the gap 555 between the end faces 506 and 507 on adjacent structural units 501 to prevent moisture from collecting, forming or freezing within the gap 555. This also prevents stones and particles from wedging into the gap 555. A pocket 557 is located midway longitudinally along the side 514 of structural unit 502 and about midway between top surface 542 and bottom surface 543. Pocket 557 is configured to receive abutting L brackets 540 on adjacent structural units 501, and further is sufficiently large to permit positioning and tightening of bolt 547 and of nut 548 on bolt 547. Pocket 557 can (but need not) extend completely vertically through structural unit 501 from top to bottom. Pocket 557 can be filled with cement or filler material after the connection is made.

Structural unit 502 is identical to structural unit 501, except that structural unit 502 includes on one end 517 an alignment pin 558 (FIG. 34) for mateably engaging an alignment anchor 559 on the other end 516 of an adjacent structural unit 502. Anchor 559 includes a face surface 560 that is flush with the end 516 of structural unit 502, and is located adjacent side 514. A pair of longitudinally oriented holes 561 and 562 extend through the face surface 560, the hole 561 being unthreaded and hole 562 being threaded. A recess 563 is formed at the end 517 of the abutting structural unit 502 near the side 514. The alignment pin 558 is secured to reinforcement wire 563 in structural unit 502, and is cast in place. The protruding end 565 of alignment pin 558 is positioned and oriented to mateably engage alignment hole 561 to align abutting structural units 502 together end-to-end. An L bracket 566 includes a first leg 567 bolted to an anchor 568 by bolt 569 in laterally adjacent structural unit 501. L bracket 566 includes a perpendicularly second leg 570 positioned flush with end 516. A bolt 571 is extended through a hole in second leg 570 into threaded hole 562. Thus, L bracket 566 holds structural unit 502 to structural unit 501, and alignment pin 558 holds structural unit 502 in alignment. Also, connections along the sides 505 and 514 hold abutting structural units together end-to-end. Alternatively, it is contemplated that a second connection can be made above or below the connection described.

An alternative connecting system 580 (FIG. 38) is disclosed and shown in detail in the co-pending patent application Ser. No. 08/239,049 which was incorporated herein by reference above. Nonetheless, a disclosure is included herein to facilitate an understanding of the present invention. The connecting system 580 includes a tube 581 that extends longitudinally through and within structural unit 501' from end 506 to end 507. Alternatively, it is contemplated that a short tube section could also be used at each end, one end of the tube section being located flush with the end 506 (and 507). Tube 581 includes a threaded end section 582 for threadably receiving and engaging an insert nut 583. Insert nut 583 includes exterior threads 584 for mateably engaging the threads on threaded tubular end 582, and further includes internal threads 585 that extend along an axially extending hole in insert nut 583. A guide member 587 includes a threaded shank 588 for engaging a threaded second end 589 of tube 581. Guide member 587 further includes a tapered nose 590 for engaging tubular threaded end 589 for guiding one structural unit 501' into alignment with a second abutting structural unit. A shear bolt 591 extends through a hole 592 in shear/guide member 587 and is configured to threadably engage threaded interior hole 585 on insert 583. Belleville washers 591 are used to control the tension on shear bolt 591. Shear bolt 591 can be held in a tensioned condition and prevented from undesirable loosening by tack welding shear bolt 591 to insert nut 583 and by tack welding insert nut 583 to tube end 589. Alternatively, the tube ends 582 and/or 589 can be partially filled with filler material. The shear bolt connection system and variations thereof is further described in U.S. patent application Ser. No. 08/239, 049. It is noted that, in FIG. 25 the tubes 581 extend longitudinally. However, tubes 581 could also extend transversely and/or could extend both longitudinally and laterally in a crisscrossing matrix. Also, it is noted that the connecting system shown in FIG. 38 could be used in combination with the connection system shown in FIG. 34.

Thus, the present invention includes a roadway or bridge construction formed by a plurality of interconnected precast structural units. The assembly of precast structural units allows relatively quick and accurate construction with close quality control and a maximum mount of prefabrication, modularity, and repairability. Further, the interconnected assembly provides upgradability and also resistance to earthquake damage and catastrophic failure from unpredicted events.

In the foregoing description, it will be readily appreciated by those skilled in the art that modifications may be made to the invention without departing from the concepts disclosed herein. Such modifications are to be considered as covered by the following claims, unless these claims by their language expressly state otherwise.

The embodiments of the invention in which an exclusive property or privilege is claimed are defined as follows:

1. A roadway construction for extending a road over an obstacle comprising:
   a structural framework including locating brackets thereon; and
   a plurality of precast structural units forming a bridge deck including an upper surface configured to support vehicles being driven thereover with said upper surface being located in a road-forming position, said precast structural units including locators mateably engaging said locating brackets for anchoring the precast structural units in a generally horizontal position on the structural framework.

2. A roadway construction as defined in claim 1 wherein said structural units comprise reinforced concrete.

3. A roadway construction as defined in claim 1 wherein said structural units include mating connectors interconnecting said structural units together in the elongated assembly.

4. A roadway construction as defined in claim 3 wherein at least one of pair of said mating connectors are located under said lower surface.

5. A roadway construction as defined in claim 3 including bolts for securing said mating connector together.

6. A roadway construction as defined in claim 5 including a Belleville washer operably positioned on said bolts.

7. A roadway construction as defined in claim 3 wherein said connectors each include an anchor precast into said structural unit and a bracket attached to said anchor.

8. A roadway construction as defined in claim 7 wherein said bracket comprises an L shaped member having a first leg attached to said anchor and a second leg configured for connection to an adjacent bracket on an adjacent structural unit.

9. A roadway construction as defined in claim 1 wherein said locator bracket includes an aperture and said locator includes a locator pin for mateably engaging said aperture.

10. A roadway construction as defined in claim 9 wherein said locator bracket includes a resilient member engaging said locator.

11. A roadway construction as defined in claim 10 wherein said resilient member includes a bushing located in said aperture for receiving said locator pin.

12. A roadway construction as defined in claim 1 wherein said locator brackets are welded.

13. A roadway construction as defined in claim 1 wherein said locator brackets are bolted.

14. A roadway construction as defined in claim 1 including a precast side rail attached to one of said structural units.

15. A roadway construction as defined in claim 1 including a fascia attached along a side of said structural units.

16. A roadway construction as defined in claim 1 wherein said structural units define an integral sidewalk.

17. A roadway construction as defined in claim 1 wherein said structural units define an integral curb along said upper surface.

18. A roadway construction as defined in claim 1 wherein said structural units define an integral side rail.

19. A roadway construction as defined in claim 1 wherein said structural units define integral passageways under said upper surface.

20. A roadway construction as defined in claim 19 wherein said passageways extend longitudinally along said structural units.

21. A roadway construction as defined in claim 1 wherein said structural units include end-mounted face gaskets for mateably sealingly engaging adjacent structural units in end-to-end abutting relationship.

22. A roadway construction as defined in claim 1 wherein said lower surface includes enlarged sections.

23. A roadway construction as defined in claim 22 wherein said enlarged sections form a matrix of intersecting beams for rigidifying said structural units.

24. A roadway construction as defined in claim 22 wherein said locators extend from said enlarged sections.

25. A roadway construction comprising:
    a plurality of reinforced precast structural units positioned end-to-end in an elongated assembly, said plurality of precast structural units including a last-assembled structural unit and a next-assembled structural unit, each of said plurality of structural units including a generally flat upper surface, and further including end surfaces and side surfaces defined at opposing end edges and opposing side edges of said upper surface, respectively, said end surfaces being configured to be mated together end-to-end, said generally flat upper surface extending continuously between said opposing side edges of said upper surface; and
    each of said plurality of structural units further including mating connectors, the mating connectors on each next-assembled structural unit being positioned to align with corresponding mating connectors on each last-assembled structural unit and further being configured to be interconnected therewith to form the elongated assembly.

26. A roadway construction as defined in claim 25 wherein said structural units comprise reinforced concrete.

27. A roadway construction as defined in claim 25 wherein said mating connectors include first connectors configured and positioned to connect a side abutting structural unit to said last-assembled structural unit in a side-by-side relationship, and wherein said mating connectors further include second connectors configured and positioned to connect an end abutting structural unit to said last-assembled structural unit in an end-to-end relationship.

28. A roadway construction as defined in claim 25 wherein said last-assembled structural unit includes a pocket in its side surface for receiving one of said mating connectors on said next-assembled structural unit to prevent interference therewith.

29. A roadway construction as defined in claim 25 including a locator bracket attached to each of said structural units, said locator bracket having an aperture, and further including locator pins for mateably engaging said aperture to locate said next-assembled structural unit to said last-assembled structural unit.

30. A roadway construction as defined in claim 25 including a precast side rail attached to one of said structural units.

31. A roadway construction as defined in claim 25 wherein said structural units define an integral curb along said upper surface.

32. A roadway construction as defined in claim 25 wherein said structural units define integral passageways under said upper surface.

33. A roadway construction as defined in claim 32 wherein said passageways extend longitudinally along said structural units.

34. A roadway construction as defined in claim 25 wherein said structural units include end-mounted face gaskets for mateably sealingly engaging adjacent structural units in end-to-end abutting relationship.

35. A roadway construction as defined in claim 25 including bolts for securing said mating connectors together.

36. A roadway construction as defined in claim 35 including a Belleville washer operably positioned on said bolts.

37. A roadway construction as defined in claim 25 wherein said mating connectors each include an anchor precast into said structural unit and a bracket attached to said anchor.

38. A roadway construction as defined in claim 37 wherein said bracket comprises an L shaped member having a first leg attached to said anchor and a second leg configured for connection to an adjacent bracket on an adjacent structural unit.

39. A roadway construction as defined in claim 25 including a matrix of intersecting ridges formed in a bottom of said structural units for rigidifying said structural units.

40. A modular structural unit adapted to be assembled end-to-end to a previously laid mating structural unit in an elongated assembly for forming a portion of a road, comprising:

a geometrically shaped, reinforced structural unit defining a longitudinal direction and having a generally flat upper surface adapted to form a portion of a road for vehicles, said reinforced structure including one end having a generally horizontally extending end seal and another end configured to matingly sealingly engage a horizontally extending end seal on a mating end of the previously laid mating structural unit, said reinforced structural unit further including side surfaces defining a width of said upper surface;

a plurality of connectors attached to said side surfaces, each having an attachment leg extending laterally from the side surface to which it is attached, said connectors being positioned on said structural unit so that said attachment leg is positioned proximate a corresponding leg on a corresponding connector on the previously laid mating structural unit; and a fastener for interconnecting said attachment leg to the corresponding leg on the corresponding connector.

41. A method comprising steps of:

demolishing and removing a worn deck of a bridge to uncover a structurally sound bridge deck support structure including horizontally extending beams;

preparing an upper surface on the bridge deck support structure;

providing a new deck comprising interconnectable precast structural modules; and installing the new deck to the upper surface by placing the structural modules of the new deck on the upper surface and by interconnecting the structural modules.

42. A method as defined in claim 41 including a step of anchoring the structural modules to the support structure with locators.

43. A highway comprising:

a plurality of reinforced composite precast sections secured together and including a surface configured to form a road, wherein said plurality of precast sections include tubular members, said tubular members being aligned in adjacent of said precast sections, and including connecting members for interconnecting said tubular members in said adjacent precast sections.

44. A highway as defined in claim 43 wherein said tubular members include threaded end sections, and said connecting members include threaded for engaging said threaded end sections.

45. A highway as defined in claim 44 wherein said tubular members include end sections, and wherein said connecting members include an insert engaging a first of said end sections, and further include a guide member engaging a second of said end sections which is adjacent said first end section, said guide member projecting into said first end section, and still further includes a fastener for interconnecting said guide member to said insert.

46. A highway as defined in claim 45 including gaskets positioned between said plurality of precast sections.

47. A highway as defined in claim 43 wherein said plurality of precast sections include sections positioned in two adjacent rows and bolted together.

48. A highway as defined in claim 47 wherein said precast sections in the two adjacent rows are positioned in an alternating, non-laterally aligned relationship.

49. A highway as defined in claim 47 wherein said precast sections in the two adjacent rows are positioned in pairs in a side-by-side aligned relationship.

50. A highway comprising:

a plurality of structural sections having opposing ends, said structural sections including tubular members having end sections located proximate said opposing ends; and connecting members for interconnecting said plurality of structural sections, each said connecting member including an insert engaging one of said end sections, a guide engaging a sections of said end section which is adjacent said one end section, and a fastener for interconnecting said guide member to said insert.

51. A bridge deck comprising:

a plurality of reinforced composite precast sections secured together including a surface configured to form a road;

said plurality of precast sections including connectors, said connectors being aligned in adjacent of said precast sections, and including fasteners for interconnecting said connectors in said adjacent precast sections, wherein said connectors include tubular members having threaded end sections, and said fasteners are threaded for engaging said threaded end sections.

52. A bridge deck as defined in claim 51 wherein said tubular members include end sections, and wherein said fasteners include an insert engaging a first of said end sections, and further including a guide member engaging a second of said end sections which is adjacent said first end section, said guide member projecting into said first end section, and still further including a bolt for interconnecting said guide member to said insert.

53. A bridge deck as defined in claim 52 including gaskets positioned between said plurality of sections.

54. A bridge deck comprising:

a plurality of structural sections having opposing ends, said structural sections including tubular members having end sections located proximate said opposing ends; and connecting members interconnecting said plurality of structural sections, said connecting members each including an insert engaging a first of said end sections, a guide engaging a second of said end section which is adjacent said first end section, and a fastener for interconnecting said guide member to said insert.

* * * * *

UNITED STATES PATENT AND TRADEMARK OFFICE
CERTIFICATE OF CORRECTION

PATENT NO. : 5,682,635
DATED : November 4, 1997
INVENTOR(S) : Tolliver et al.

It is certified that error appears in the above-identified patent and that said Letters Patent is hereby corrected as shown below:

Column 1, line 58,

"mount" should be --amount--.

Column 3, line 19;

"XXIV" should be --XXXIV--.

Column 5, line 5;

"rarely" should be --firmly--.

Column 6, line 16;

"east" should be --cast--.

Column 7, line 3;

"Figs. 9 and 9A" should be --Figs. 8 and 9A--.

Column 7, line 8;

"potions" should be --portions--.

Column 8, line 11;

"mad" should be --road--.

UNITED STATES PATENT AND TRADEMARK OFFICE
CERTIFICATE OF CORRECTION

PATENT NO. : 5,682,635
DATED : November 4, 1997
INVENTOR(S) : Tolliver et al.

It is certified that error appears in the above-identified patent and that said Letters Patent is hereby corrected as shown below:

Column 10, line 65;

"realfix" should be --matrix--.

Column 13, line 10;

"until" should be --unit--.

Column 13, line 33;

"is" should be --if--.

Column 13, line 55;

"surface. 342" should be --surface 342.--.

Column 14, line 65;

"comer" should be --corner--.

Column 19, claim 44, line 60;

After "threaded" (first occurrence) insert --fasteners--.

UNITED STATES PATENT AND TRADEMARK OFFICE
CERTIFICATE OF CORRECTION

PATENT NO. : 5,682,635
DATED : November 4, 1997
INVENTOR(S) : Tolliver et al.

It is certified that error appears in the above-identified patent and that said Letters Patent is hereby corrected as shown below:

Column 19, claim 45, line 62;

"44" should be --43--.

Column 20, claim 54, lines 58 and 59;

"section" should be --sections--.

Signed and Sealed this

Ninth Day of June, 1998

Attest:

BRUCE LEHMAN

*Attesting Officer*  *Commissioner of Patents and Trademarks*